Figure 1:
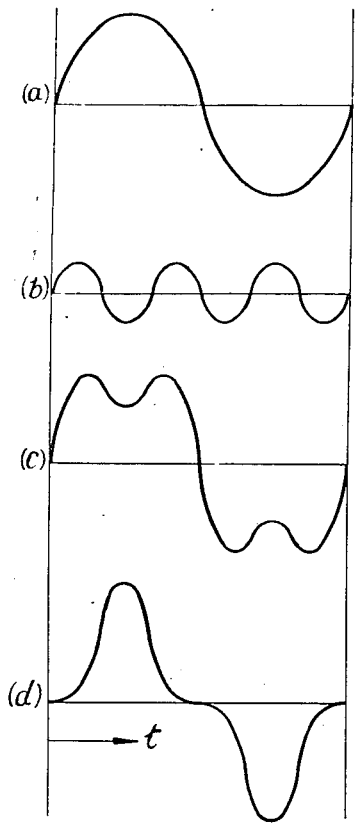

April 8, 1952     C. E. G. BAILEY     2,591,908

RADIO NAVIGATION AID

Filed Jan. 24, 1948     2 SHEETS—SHEET 1

INVENTOR
Christopher Edmund Gervase Bailey
By *Fred M Vogel*
AGENT

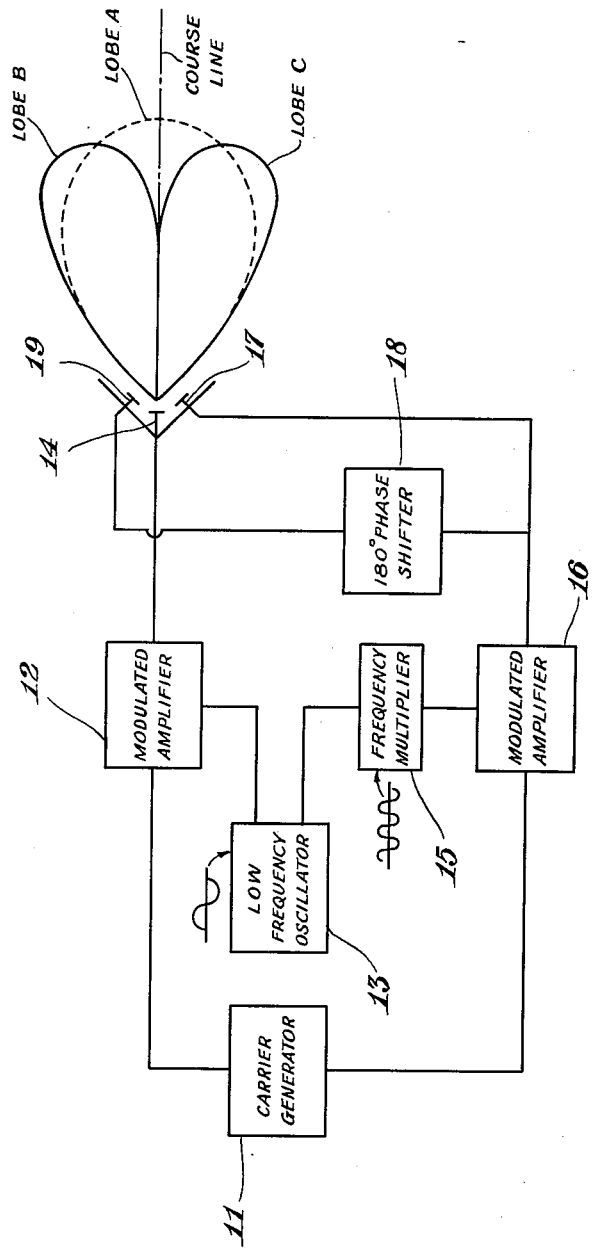

Patented Apr. 8, 1952

2,591,908

UNITED STATES PATENT OFFICE 2,591,908

RADIO NAVIGATION AID

Christopher Edmund Gervase Bailey, London, England, assignor to The Hartford National Bank and Trust Company, Hartford, Conn., as trustee Application January 24, 1948, Serial No. 4,108
In Great Britain October 25, 1944

Section 1, Public Law 690, August 8, 1946
Patent expires October 25, 1964

6 Claims. (Cl. 343—107)

This invention relates to radio navigational aid systems of the type in which a desired course is defined by the overlapping of two radiation patterns emitted by a transmitter, each being distinguished by a characteristic form of modulation and/or keying.

One known form of such navigational aid or beacon radiates one pattern modulated by an audio-frequency and keyed by a Morse letter, and another pattern modulated by the same audio-frequency keyed in the intervals of the first. The course-line is then defined by the quality of the two patterns, which are heard as a steady note only when received at a point on the desired course. Such distinction of the two patterns is specially suitable for aural indication, but less suitable, owing to technical difficulties in the translation device, to indication on a centre-zero instrument of meter type.

In another known form of beacon, each of two patterns is continuously modulated by a different audio frequency. Indications are transferred to a meter by separately filtering and rectifying each audio frequency after detection, and feeding the rectified outputs in opposition to a central-zero meter. In this form of beacon, the characteristics of a number of components in the receiver, and in the transmitter must be maintained constant if the meter is to give a true indication. Such a requirement is opposed to the reliability and ease of maintenance of the system.

The object of the invention is to provide an improved navigational aid system of the type defined adapted to provide a course indication on a centre zero instrument.

According to the invention in a radio navigational aid system of the type specified a transmitter radiates overlapping spatial patterns modulated by waves of the same or integral multiples of the same fundamental frequency, only one of the patterns reversing about the course.

According to a first embodiment of the invention, the pattern which does not reverse about the course is modulated by a sinusoidal wave of a predetermined frequency, the pattern which reverses about the course being modulated by a sinusoidal wave of three times the said predetermined frequency.

According to a second embodiment of the invention the pattern which does not reverse about the course consists of a rectangular wave maintaining alternately for equal periods two different amplitudes while the pattern which reverses about the course is modulated by a rectangular wave maintaining alternately two amplitudes, each for a time substantially different from half the period of the first modulation, the frequency of this second modulation being twice the frequency of the first modulation.

The invention will now be more particularly described with reference to the accompanying drawing, in which:—

Figure 2:
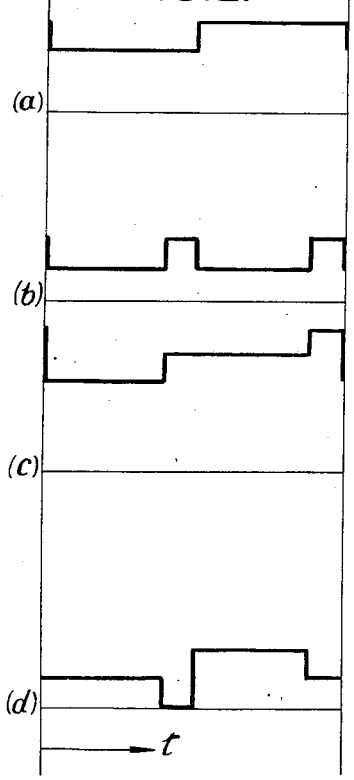
Figure 3:
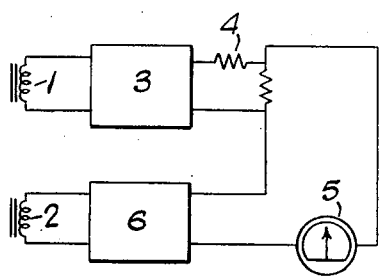
Figure 4:
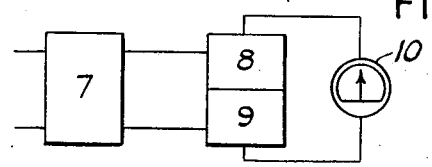

Figures 1 and 2 illustrate the wave forms produced with the use of sinusoidal wave modulation according to the first embodiment of the invention, and with the use of rectangular wave modulation according to the second embodiment of the invention, respectively, Figure 3 is a diagrammatic representation of part of a receiving means for use in a radio navigational aid system according to the first embodiment of the invention, and Figure 4 is a diagrammatic representation of part of a receiving means for use in a system according to the second embodiment of the invention.

Fig. 5 is a block diagram of a beacon transmitter in accordance with the invention.

Referring now to Figure 1, which shows four waveforms designated $(a)$, $(b)$, $(c)$ and $(d)$ plotted on a common time scale $t$, Figure 1$(a)$ illustrates the sinusoidal wave modulation of the pattern which does not reverse about the course and Figure 1$(b)$ the sinusoidal wave modulation of the pattern which reverses about the course and the frequency of which is three times that shown in Figure 1$(a)$. It will readily be seen that the two overlapping patterns will produce an additive effect on one side of the course and a subtractive effect on the other side of the course, producing resultant waveforms of the general nature illustrated in Figure 1$(c)$ and Figure 1$(d)$, respectively.

Figure 2 shows four waveforms $(a)$, $(b)$, $(c)$ and $(d)$ also plotted on a common time scale $t$. Figure 2$(a)$ illustrates the rectangular wave, maintaining alternately for equal periods two different amplitudes, providing modulation of the pattern which does not reverse about the course and Figure 2$(b)$ the rectangular wave, maintaining alternately two amplitudes each for a period substantially different from half the period of the first wave, providing modulation of the pattern which reverses about the course. Similarly as explained with reference to Figure 1, an additive effect produces a resultant waveform of the general nature illustrated in Figure 2$(c)$ on one side of the course and a subtractive effect produces a resultant waveform of the general nature illustrated in Figure 2(d) on the other side of the course.

In Figure 3, secondary windings 1 and 2 provide coupling with aerial and tuning circuits (not shown). The energy receiver by winding 1 is supplied by way of a "peak" rectifier 3 (i. e. a rectifier the output of which is proportional to the peaks of the input wave) and an attenuator 4 to a centre-zero meter 5 in opposition to the energy received by winding 2 which is supplied to the meter 5 by way of a "mean" rectifier 6 (i. e. a rectifier the output of which is proportional to the rectified mean of the input wave).

Considering now the effect of receiving with the aid of a receiver comprising the circuit-arrangement illustrated diagrammatically in Figure 3, radiation modulated in the manner described with reference to Figure 1 at any point in the radiation area of the beacon emitting the modulated radiation, the output of the peak rectifier 3 is either greater or less than $\pi/2$ times the output of the mean rectifier 6 according as the higher frequency modulation is in phase or counterphase with the lower frequency modulation at the peaks of the latter. The meter 5 will thus give an indication to the one side or the other side of its zero as the vehicle to be navigated moves to one side or the other of the course.

A receiver adapted to receive radiation modulated in the manner described with reference to Figure 2 is shown diagrammatically in Figure 4. In this embodiment the radiation received is passed through a filter 7 which eliminates the steady components thereof and is then supplied to two half-wave peak rectifiers 8 and 9 with their inputs and outputs in opposition. The combined output is reversed with a reversal of phase of the higher frequency modulation. The opposed outputs of the half-wave peak rectifiers are fed to a central-zero meter, which is adapted to give indications similar to those provided by the first embodiment.

Although the aid afforded to navigation is described in the foregoing description as the indications of a meter, it may alternatively consist of the automatic steering of the vehicle by electromechanical devices controlled by the currents which have been described as applied to the meter. Such automatic steering may be combined with the visual indication described or with other means of visual indication.

Many other forms of modulation, whose fundamental frequencies are the same or multiples one of another, may be used for the purpose described. In particular, the rectangular waves described in the second embodiment may be separated by comparatively long periods of time, as described in British Specification No. 580,985. With a modification of the wave-form therein described to form a complete cycle of the type involved in the second embodiment of the present invention, the indicating means of British Specification No. 580,985 may be combined with automatic steering means to enable an aircraft to be controlled either automatically or by the response of the pilot to the aforesaid indicating means.

By suitable selection of the modulation frequencies, the method of course indication described in the specification is equally applicable to either the "fixed course" or "omni-course" type of beacon and throughout this specification the term "course" is intended to indicate either a fixed course, i. e. a course fixed in space and determined by the characteristics of the transmitting aerial system, or a course defined by a beacon of the "rotating field" or "omni-course" type in which a rotating field of modulation is produced by the cyclic excitation of a spaced aerial adjustment carried out in the moving vehicle.

Referring now to Fig. 5, it will be seen that a beacon transmitter in accordance with the invention comprises a carrier wave generator 11 whose output is modulated in amplifier 12 by a sinusoidal oscillation produced by a low-frequency oscillator 13, the output of the amplifier 12 being fed to an antenna 14 emitting a first radiation pattern, indicated by lobe A, whose central axis coincides with the desired course line.

A sinusoidal oscillation whose frequency is three times that of oscillator 13 is derived from a frequency multiplier 15 and imposed as a modulation on the carrier wave in an amplifier 16. The output of amplifier 16 is fed to an antenna 17 projecting a lobe B on one side of the source line, and is also fed through a 180° phase-shifting device 18 to an antenna 19 projecting a lobe C on the other side of the course line. Thus a second radiated pattern is formed which is constituted by lobes B and C in phase opposition on either side of the course line.

It is obvious, that in lieu of sinusoidal modulating voltages of the type called for in Fig. 5, rectangular modulating pulses, as shown in Fig. 2, may be employed.

I claim:

1. In a radio beacon system for defining a course line, the combination comprising means to project on either side of said course line a first radiation pattern of wave energy modulated by periodic rectangular pulses having a predetermined frequency, the duration of the pulses in said first pattern being equal to the spacing therebetween, and means to project a second and overlapping radiation pattern on either side of said course line modulated by periodic rectangular pulses having a frequency twice that of said predetermined frequency, the duration of the pulses in the second pattern being less than the spacing therebetween.

2. In a radio beacon system, a receiver for intercepting wave energy constituted by a first radiation pattern projected on either side of a course line of wave energy modulated by a sinusoidal oscillation of predetermined frequency and a second and overlapping pattern projected on either side of said course line of wave energy modulated by a sinusoidal oscillation whose frequency is three times said predetermined frequency, the phase of the sinusoidal oscillation in said second pattern on one side of said course line being displaced 180° from that on the other side of said course line, said receiver comprising means to demodulate the intercepted wave energy to derive the modulation component thereof, first rectifier means to derive from said modulation component a first voltage proportional to the peak value thereof, second rectifier means to derive from said modulation component a second voltage proportional to the mean value thereof, and means for combining said first and second voltages to produce an indication of the position of said receiver relative to said course line.

3. An arrangement, as set forth in claim 2, wherein said indicating means includes a center-zero voltmeter and means to apply said first and second voltages in opposing polarity to said voltmeter.

4. In a radio beacon system, a receiver for intercepting wave energy constituted by a first radiation pattern projected on either side of a course line of wave energy modulated by a sinusoidal oscillation of predetermined frequency and a second and overlapping pattern projected on either side of said source line of wave energy modulated by a sinusoidal oscillation whose frequency is three times said predetermined frequency, the phase of the sinusoidal oscillation in said second pattern on one side of said course line being displaced 180° from that on the other side of said course line, said receiver comprising means to demodulate the intercepted wave energy to derive the modulation component thereof, first rectifier means to derive from said modulation component a first voltage proportional to the peak value thereof, second rectifier means to derive from said modulation component a second voltage proportional to the mean value thereof, a center-zero voltmeter, the output of said first rectifier means and the output of said second rectifier means being applied in opposing polarity to said voltmeter, and an attenuator network interposed between the output of said first rectifier means and said first winding to attenuate the output of said first detector in the ratio $2/\pi$.

5. In a radio beacon system, a receiver for intercepting wave energy constituted by a first radiation pattern projected on either side of a course line of wave energy modulated by periodic rectangular pulses having a predetermined frequency, the duration of said pulses being equal to the spacing therebetween, and a second and overlapping radiation pattern projected on either side of said course line of wave energy modulated by periodic rectangular pulses having a frequency twice that of said predetermined frequency, the duration of the pulses in the second pattern being less than the spacing therebetween, said receiver comprising means to demodulate the intercepted wave energy to derive the modulation component therefrom first and second rectifiers to derive from said modulation component first and second voltages proportional to the peak value of said modulation component, and means for combining said voltages differentially to provide an indication of the position of said receiver relative to said course line.

6. An arrangement, as set forth in claim 5, wherein said means to combine said voltages differentially is constituted by a center-zero voltmeter and means to apply the outputs of the respective rectifiers in opposition to said voltmeter.

CHRISTOPHER EDMUND
GERVASE BAILEY.

REFERENCES CITED

The following references are of record in the file of this patent:

UNITED STATES PATENTS

| Number | Name | Date |
|---|---|---|
| 1,991,474 | Taylor | Feb. 19, 1935 |
| 1,991,476 | Thomas | Feb. 19, 1935 |
| 2,107,155 | Kleinkauf et al. | Feb. 1, 1938 |
| 2,400,736 | Brown | May 21, 1946 |
| 2,404,810 | O'Brien | July 30, 1946 |
| 2,414,791 | Barrow | Jan. 28, 1947 |
| 2,430,244 | O'Brien | Nov. 4, 1947 |
| 2,438,987 | Bailey | Apr. 6, 1948 |